US007106501B2

(12) United States Patent
Starodoumov et al.

(10) Patent No.: US 7,106,501 B2
(45) Date of Patent: Sep. 12, 2006

(54) FIBER AMPLIFIER WITH SUPPRESSION OF AMPLIFIED SPONTANEOUS EMISSION

(75) Inventors: Andrei Starodoumov, Cupertino, CA (US); Skip Bettencourt, Santa Clara, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 10/965,062

(22) Filed: Oct. 14, 2004

(65) Prior Publication Data

US 2006/0082867 A1   Apr. 20, 2006

(51) Int. Cl.
*H01S 4/00* (2006.01)
*H04B 10/12* (2006.01)

(52) U.S. Cl. ............................... 359/337.2; 359/337.21
(58) Field of Classification Search ............. 359/337.2, 359/337.21
See application file for complete search history.

(56) References Cited

U.S. PATENT DOCUMENTS

| | | | | |
|---|---|---|---|---|
| 5,283,686 | A * | 2/1994 | Huber | 359/337 |
| 5,598,294 | A * | 1/1997 | Uno et al. | 359/337.21 |
| 5,636,301 | A * | 6/1997 | O'Sullivan et al. | 385/24 |
| 5,812,712 | A * | 9/1998 | Pan | 385/37 |
| 5,867,306 | A * | 2/1999 | Isshiki | 359/337.1 |
| 6,160,658 | A * | 12/2000 | Ishikawa | 359/337 |
| 6,222,962 | B1 * | 4/2001 | Nilsson et al. | 385/37 |
| 6,335,941 | B1 * | 1/2002 | Grubb et al. | 372/6 |
| 6,377,392 | B1 * | 4/2002 | Mizrahi | 359/337.21 |
| 6,388,802 | B1 | 5/2002 | Allan | 359/337 |
| 6,529,317 | B1 | 3/2003 | Choi et al. | 359/341.31 |
| 6,532,106 | B1 | 3/2003 | Chung et al. | 359/341.2 |
| 6,563,995 | B1 | 5/2003 | Keaton et al. | 385/127 |
| 6,831,779 | B1 * | 12/2004 | Caplan | 359/347 |
| 2002/0003655 | A1 | 1/2002 | Park et al. | 359/341.1 |
| 2002/0176451 | A1 | 11/2002 | Lee et al. | 372/6 |
| 2002/0186914 | A1 | 12/2002 | Li | 385/11 |
| 2003/0202547 | A1 | 10/2003 | Fermann et al. | 372/6 |

* cited by examiner

*Primary Examiner*—Deanora M. Hughes
*Assistant Examiner*—Eric Bolda
(74) *Attorney, Agent, or Firm*—Stallman & Pollock LLP

(57) ABSTRACT

A fiber amplifier module for amplifying a signal pulse includes an optically pumped double-pass fiber amplifier in which a fiber Bragg grating reflects an amplified pulse in between the first and second amplification passes, and transmits most forward-propagating amplified spontaneous emission (ASE) generated by the optical pumping. The reflected amplified pulse from the double-pass amplifier, and reverse-propagating ASE generated by the optical pumping are reflected from another fiber Bragg grating that again reflects the amplified pulse and transmits most of the ASE. The twice-reflected amplified pulse can be delivered from the amplifier as an output pulse or passed to another amplifier module for further amplification. The amplifier fiber is operated in a saturated or near saturated mode. This reduces amplification of any portion of the forward-propagating ASE that is reflected into reverse propagation by the fiber Bragg grating of the double-pass amplifier.

22 Claims, 2 Drawing Sheets

FIBER AMPLIFIER WITH SUPPRESSION OF AMPLIFIED SPONTANEOUS EMISSION

TECHNICAL FIELD OF THE INVENTION

The present invention relates generally to optical fiber amplifiers. The invention relates in particular to a double-pass optical fiber amplifier module including a narrow band reflective grating arrangement for separating amplified spontaneous emission (ASE) from a signal amplified by the amplifier.

DISCUSSION OF BACKGROUND ART

High power fiber lasers and amplifiers are effective converters of low brightness radiation (optical pump light) from diode-lasers to high brightness single-mode laser radiation. Such lasers and amplifiers have an "all-fiber" construction, and exhibit excellent stability and excellent beam quality. High power fiber lasers and amplifiers can be a viable alternative to "bulk" solid-state lasers for scientific and industrial applications.

A fiber laser has a higher overall efficiency than a bulk laser, for example, about twice the efficiency. In continuous wave (CW) operation, a fiber laser can have an optical-to-optical efficiency approaching 80%. Such a high efficiency is achieved by keeping optical pump light and signal light in a fiber core with no diffraction loss and no reflection from bulk intracavity elements. In pulsed operation, however, the efficiency of fiber lasers drops significantly, for example to between about 10% and –30% of the CW efficiency. A reason for this is as follows. In order to modulate (pulse) the light, bulk acousto-optical or electro-optical modulators are used. This requires that light is coupled out of a fiber in order to be modulated and then coupled back into another fiber. Coupling light out of a fiber and back into a fiber results in 20%–40% extra loss in a fiber laser cavity with bulk modulators.

For pulsed operation, a master oscillator power amplifier (MOPA) system is preferred. In such an arrangement, a relatively low power laser provides laser radiation pulses having desired characteristics. These pulses are then amplified to high power in an efficient fiber amplifier. The efficiency of the fiber amplifier determines the overall efficiency of the MOPA system.

One common MOPA system comprises a master oscillator and a multistage amplifier. The master oscillator can be a solid-state laser, a fiber laser, or a semiconductor laser that provides light pulses having required optical parameters. These parameters include spectral width, pulse repetition rate, and pulse length. In a pulsed (modulated) diode-laser, pulse length and pulse repetition rate can be independently controlled. In a solid-state laser, and in a fiber laser, pulse length changes with repetition rate.

In order to amplify low power pulses, for example, pulses with less than one-watt (<1.0 W) of power, to pulses having a power of 1.0 Kilowatts (KW) or more, multiple amplification stages are necessary. A rare-earth-ion-doped silica-fiber amplifier can provide high gain (up to about 30 dB) for a small signal. Such strong gain causes a self-excitation of the amplifier due to back-reflection from fiber ends. This is termed amplified spontaneous emission (ASE). Strong gain and back reflection can also give rise to cross-talk between amplifier stages in a multi-stage amplifier. ASE from one amplifier stage can be amplified in a second stage. This self excitation takes part of the stored energy (resulting from optical pumping) of the second stage, which would otherwise be available for signal amplification. This can lead to instability in a fiber MOPA system with multistage amplification.

Suppression of back reflection and isolation between amplifier stages is necessary to combat instability in a MOPA system with multistage amplification. Typically, rare-earth ions in silica have a broad spectrum of spontaneous (fluorescence) emission. By way of example, the fluorescence spectrum of an ytterbium (Yb) doped silica fiber has a fluorescence band extending from about 1020 nanometers (nm) to about 1180 nm, and a strong separate fluorescence peak at 976 nm. Because of this, broadband isolation is required.

In prior-art MOPA systems, bulk optical elements such as isolators, spectral filters, acousto-optic modulators and the like have been used between amplifier stages. Such bulk optical elements are at least partially effective, but have certain shortcomings. By way of example, an isolator provides only unidirectional isolation and an acousto-optical modulator introduces high insertion losses in a system and is only effective when in a closed condition. A narrow passband spectral filter can be effective in reducing the spectral width of ASE to about 1 nanometer. It is difficult, however, to make such a narrow-band spectral filter with strong (>15 dB) rejection of wavelengths in a broadband ASE spectrum corresponding, for example, to Yb ions.

Any MOPA system wherein isolation elements add loss may require more amplification stages than a system without such amplification stages. These additional stages add cost to a MOPA system in addition to the cost of the lossy, bulk isolation elements that create the need for these added stages. Accordingly, there is a need for a method and apparatus for providing more effective ASE and cross-talk suppression in a multistage MOPA system. There is also a need for such a method and apparatus that does not require bulk optical elements and that can provide, with less amplification stages, at least the same overall gain as a prior-art MOPA system.

SUMMARY OF THE INVENTION

The present invention is directed to a method and apparatus for amplifying an optical signal. The signal may be delivered by either a laser or another optical amplifier. In one aspect the inventive method comprises providing a length of amplifier fiber. The optical signal is propagated along the amplifier fiber in a forward direction therein while coupling optical pump light into the optical fiber to energize the optical fiber and provide optical gain, thereby amplifying the optical signal and generating amplified spontaneous emission (ASE). The ASE propagates in forward and reverse directions in the amplifier fiber, and has a bandwidth substantially greater than the bandwidth of the optical signal. Following the forward direction propagation in the amplifier fiber, the amplified optical signal is reflected from a first fiber Bragg grating in a reverse direction in the amplifier fiber while a substantial portion of the forward-propagating ASE is transmitted through the first fiber Bragg grating. A length of a non-amplifying optical fiber is provided. The reflected amplified signal and reverse-propagating ASE from the amplifying fiber is propagated along the non-amplifying fiber in a forward direction therein. Following the forward direction propagation in the non-amplifying fiber, the reflected amplified optical signal is reflected from a second fiber Bragg grating to provide a twice-reflected amplified optical signal propagating in a reverse direction in the non-amplifying fiber, and a substantial portion the reverse-propagating ASE is transmitted through the second fiber Bragg grating.

One preferred embodiment of apparatus for carrying out the method of the present invention includes a four-port fiber circulator, a first port of which is arranged to receive the optical signal to be amplified. The amplifier fiber has one end thereof connected to a second port of the circulator, and the first fiber Bragg grating is written into the amplifier fiber at an opposite end thereof. The non-amplifying fiber has one end thereof connected to a third port of the circulator and the second fiber Bragg grating is written into the non-amplifying fiber at an opposite end thereof.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
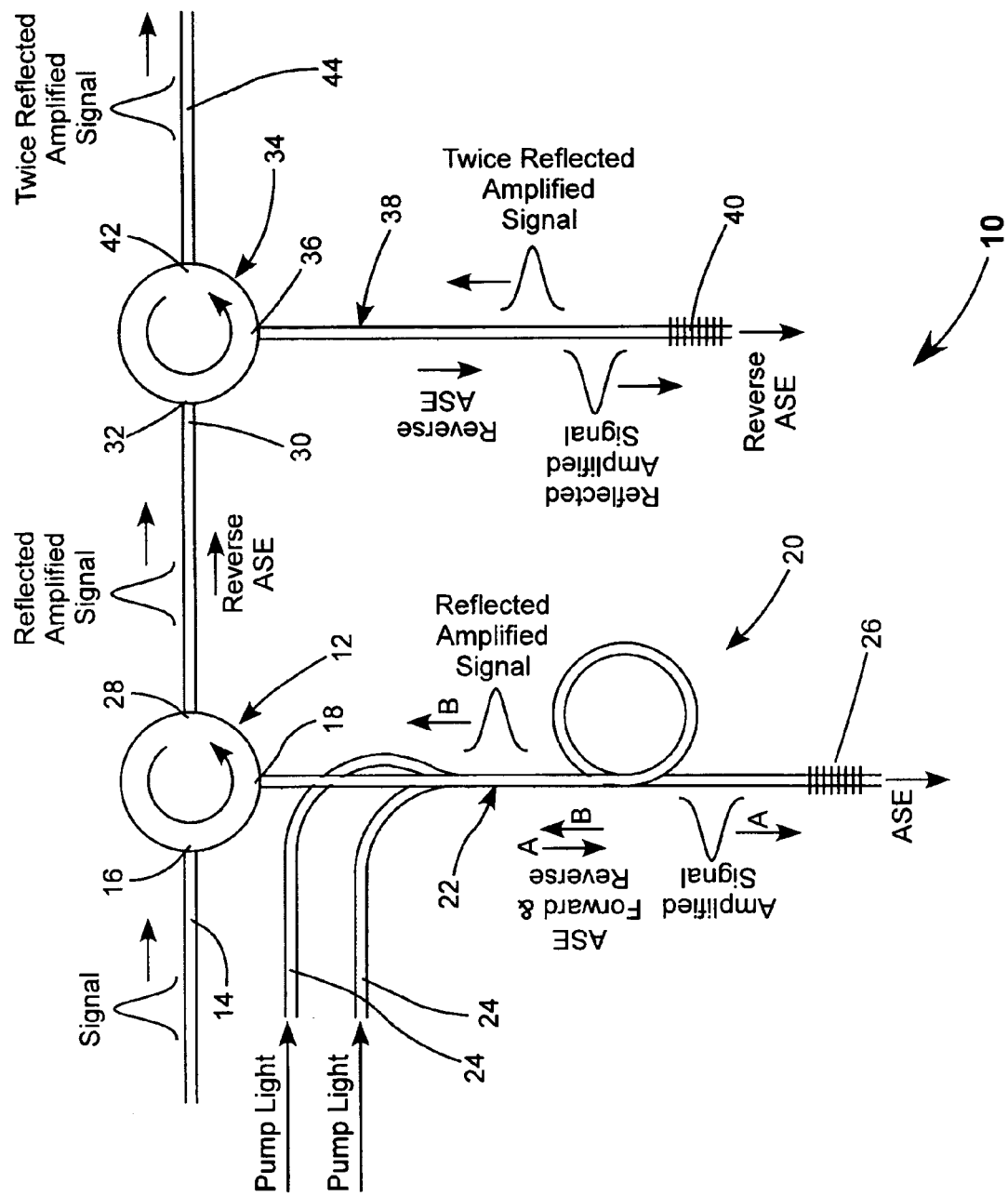
FIG. 1 schematically illustrates a preferred embodiment of a double-pass amplifier module in accordance with the present invention, including a first three-port circulator having a first port thereof arranged to receive a signal to be amplified, a second port thereof being connected to a double-pass amplifier fiber for amplifying the signal, the amplifier including an ASE-transmitting fiber-Bragg-grating reflector, and a third port thereof connected to a first port of a second three-port circulator, the second three-port circulator having a second port thereof connected to a fiber also including an ASE-transmitting fiber-Bragg-grating reflector and having a third port thereof arranged to deliver the amplified signal.

Referring now to the drawings, wherein like components are designated by like reference numerals, FIG. 1 schematically illustrates a preferred embodiment 10 of a double-pass amplifier module in accordance with the present invention. Amplifier 10 includes a three-port circulator 12. An optical fiber 14, preferably single-mode optical fiber, delivers a signal (pulse) to be amplified to a first port 16 of the three-port circulator. The signal here may be a pulse from a master oscillator, or a previously amplified pulse from an amplifier stage of a MOPA system. The signal can be characterized as having a center wavelength and a bandwidth.

A second port 18 of circulator 12 is connected to a double-pass fiber amplifier 20. Fiber amplifier 20 includes an amplifier fiber 22, again, preferably a single-mode optical fiber, having a doped core (not shown), for example an ytterbium-doped (Yb-doped) core. Multimode fibers 24 transport pump light from a pump light source and are arranged to couple the pump light into cladding (not shown) of fiber 22 for energizing the amplifier fiber core. Only two multimode fibers 22 are depicted in FIG. 1 for simplicity of illustration. Those skilled in the art to which the present invention pertains will recognize, however, that more or less pump-light-transporting fibers may be used to couple the pump light into the amplifier fiber without departing from the spirit and scope of the invention.

The signal to be amplified exits second port 18 of circulator 12, propagates through amplifier fiber 22 in a forward direction (arrow A), and is amplified while propagating. The amplified signal is reflected from a fiber Bragg grating 26, here, written into the amplifier fiber. Alternatively, the Bragg grating is written into a separate length of optical fiber spliced to said amplifier fiber 22.

Bragg grating 29 is highly reflective, for example greater than about 99% reflective at the center wavelength of the signal. The Bragg grating preferably has a reflection bandwidth sufficiently wide to reflect essentially all, for example, greater than about 99%, of the amplified signal, but sufficiently narrow that it is transmissive for ASE wavelengths longer and shorter than the wavelengths of the reflection bandwidth. Preferably, grating 26 has a reflection bandwidth of about 1.0 nm or less. ASE is generated as a result of optically pumping amplifier fiber 22. The ASE propagates in the amplifier in both forward and reverse directions (arrows A and B respectively) and has a bandwidth at least about 10 and often 40 or more times greater than that of the amplified signal. Accordingly, a substantial portion of the ASE generated in the forward direction is transmitted through Bragg grating 26 out of amplifier fiber 22. Preferably, more than 95% of forward generated (forward) ASE outside the reflection band of the grating is transmitted by the grating. That portion of the forward ASE within the reflection band of the grating will be reflected with the amplified signal but will be no more than about 10% of total forward ASE. Preferably, more than 85% of the total forward ASE is transmitted by the grating. The reflected amplified signal, any reflected ASE inside the reflection band of the grating, any ASE outside the reflection band that is not transmitted through Bragg grating 26, and ASE originally generated in the reverse direction, propagate in the reverse direction through amplifier fiber 22 to circulator 12 (arrow B). In FIG. 1, these ASE components are collectively designated as reverse ASE.

Preferably, amplifier fiber 22 is operated in a saturation or near saturation mode. These modes may be collectively referred to as an "essentially saturated" mode. This means that input signal power is selected, consistent with, optical pump power, absorption and emission cross-sections and the excited state lifetime of the fiber, to be high enough that population inversion of active ions, and hence the gain coefficient in the fiber amplifier, begins to be saturated by passage of the signal through the amplifier fiber. In other words, the rate of signal growth (signal gain) decreases as function of distance traveled in the fiber until a distance is traveled after which no significant gain is available. A typical "small signal" fiber amplifier has gain of between about 30 and 40 decibels (dB). A saturated fiber amplifier, however, provides signal gain less than 15 dB and possibly less than 10 dB. Saturating the fiber with the signal, however, reduces the gain of the fiber for ASE, and, accordingly, reduces the total ASE generated compared with that of a small signal amplifier.

Preferably, the length of amplifier fiber 22 is selected in accordance with the power of the signal to be amplified, optical pump light power, and above discussed characteristics of the amplifier fiber, such that the signal gain in the amplifier fiber is substantially saturated when the signal has made one round trip in the amplifier. Accordingly, the gain of amplifier fiber 22 in the reverse direction of propagation is less than the gain in the forward direction. Preferably, the saturation of amplifier 22 is arranged such that the gain in the reverse direction is less than 80% of the gain in the forward direction.

The reflected amplified signal and reverse ASE propagating in the direction of the reflected amplified signal enter circulator 12 through second port 18 thereof and exit the circulator through third port 28 thereof. The amplified signal and reverse ASE are transported via a fiber 30, preferably a single-mode fiber, to a first port 32 of a three-port circulator 34. A second port 36 of circulator 34 is connected to an optical fiber 38 that is also preferably a single-mode fiber. Optical fiber 38 includes a fiber Bragg grating 40 having reflection and transmission characteristics similar to those described above for fiber Bragg grating 26.

The reflected amplified signal and reverse ASE exit second port 36 of circulator 34 and propagate through optical fiber 38 in a forward direction. The reflected amplified signal is reflected from fiber Bragg grating 40, and a substantial portion of the reverse ASE is transmitted by the grating out of optical fiber 38. The reflected, amplified signal and any ASE that is not transmitted through Bragg grating 40 propagate back through optical fiber 38 to circulator 34. Any ASE remaining, here, of course, will now be heavily attenuated compared with the total of originally generated ASE. Amplified signal light and heavily attenuated ASE are delivered from third port 42 of circulator 34 to an optical fiber 44, again, preferably a single-mode optical fiber.

In amplifier 10, ASE reaching optical fiber 44 can be attenuated, compared with originally generated ASE, by at least about 10.0 decibels (dB) or greater, and even by about 13 dB or greater. The amplified signal light from optical fiber 44 can be delivered from amplifier 10 as output radiation for use in an application, or delivered to another amplifier module for further application.

Figure 2:
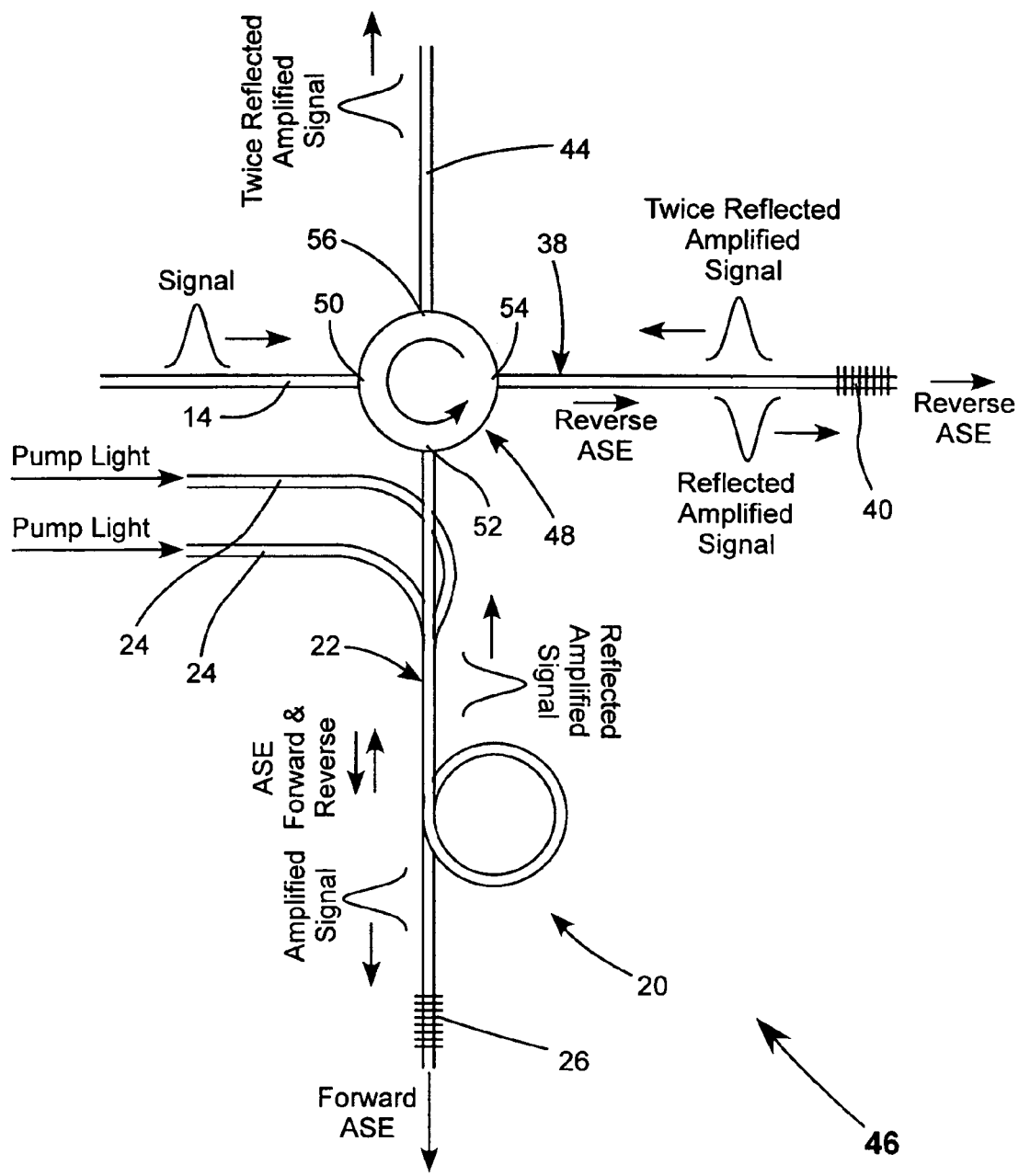
FIG. 2 schematically illustrates another preferred embodiment of a double-pass amplifier module in accordance with the present invention including a four-port circulator having a first port thereof arranged to receive a signal to be amplified, a second port thereof connected to a double-pass amplifier fiber for amplifying the signal and including an ASE-transmitting fiber-Bragg-grating reflector, a third port thereof connected to a fiber also including an ASE-transmitting fiber-Bragg-grating reflector and having a fourth port thereof arranged to deliver the amplified signal.

FIG. 2 schematically illustrates another embodiment 46 of a double-pass fiber-amplifier module in accordance with the present invention. Amplifier 46 is similar to amplifier 10 of FIG. 1 with an exception that in amplifier 46 a four-port circulator 48 replaces three-port circulators 12 and 34 of amplifier 10 and optical fiber 30 connecting the three-port circulators.

In amplifier 46, single-mode optical fiber 14 delivers the signal (pulse) to be amplified to a first port 50 of the four-port circulator. A second port 52 of circulator 12 is connected to amplifier fiber 22 of double-pass fiber amplifier 20. The signal to be amplified exits second port 52 of circulator 12, propagates through amplifier fiber 22 in a forward direction (arrow A), and is amplified while propagating. The amplified signal is reflected from the fiber Bragg grating 26. ASE is transmitted through Bragg grating 26 out of amplifier fiber 22 as described above.

The reflected amplified signal and reverse ASE propagate back through amplifier fiber 22 to circulator 48. Again, amplifier fiber 22 is preferably operated in a saturation or near saturation mode. The reflected amplified signal and reverse ASE propagating in the direction of the reflected amplified pulse enter circulator 48 through second port 52 thereof and exit the circulator through third port 54 thereof. The amplified signal and reverse ASE propagate through an optical single-mode fiber 38, preferably a single-mode optical fiber, to fiber Bragg grating 40 thereof. The amplified signal is reflected from fiber Bragg grating 40 and most of the reverse ASE is transmitted by the grating out of optical fiber 38 as discussed above. The reflected amplified signal and any ASE that is not transmitted through Bragg grating 40 propagate back through optical fiber 38 to circulator 48. Amplified signal light and heavily attenuated ASE are delivered from fourth port 56 of circulator 48 to single-mode optical fiber 44.

In the above-discussed embodiments of the inventive amplifier module there are no bulk optical elements required to provide ASE suppression or inter-stage isolation. The term "bulk elements", here, refers to a group of elements consisting of an optical isolator, a thin-film interference filters, and a diffraction grating. Light does not need to leave a module, interact with a bulk optical device and then be directed back into another module. This avoids the extraction and insertion losses of prior art amplifier modules. By way of example, in any embodiment, input fiber 14 can be fiber-connected directly with an input device, be it a fiber laser or a previous fiber amplifier stage. Similarly in an apparatus involving two or more of the inventive modules, output fiber 44 of a first module may provide the function of input fiber 14 of a second module.

The present invention is described above in terms of a preferred and other embodiments. The invention is not limited, however, to the embodiments described and depicted. Rather, the invention is limited only by the claims appended hereto.

What is claimed is:

1. A method of amplifying an optical signal, the signal being delivered by either a laser or an optical amplifier, and the optical signal having a power, a center wavelength and a bandwidth, the method comprising the steps of:

providing a length of amplifier fiber;

propagating the optical signal along said amplifier fiber in a forward direction therein while coupling optical pump light into said optical fiber to energize said optical fiber and provide optical gain, thereby amplifying the optical signal and generating amplified spontaneous emission (ASE) propagating in forward and reverse directions in said amplifier fiber, said ASE having a bandwidth substantially greater than the bandwidth of the optical signal;

following said forward direction propagation in said amplifier fiber, reflecting said amplified optical signal from a first fiber Bragg grating in a reverse direction in said amplifier fiber while transmitting a substantial portion of said forward-propagating ASE through said first fiber Bragg grating, wherein the signal power is such that said amplifier fiber has substantially greater optical gain for said amplified optical signal in said forward direction therethrough than in said reverse direction therethrough;

providing a length of a non-amplifying optical fiber;

propagating said reflected amplified signal and reverse-propagating ASE from said amplifying fiber along said non-amplifying fiber in a forward direction therein; and following said forward direction propagation in said non-amplifying fiber, reflecting said reflected amplified optical signal from a second fiber Bragg grating to provide a twice-reflected amplified optical signal propagating in a reverse direction in said non-amplifying fiber while transmitting a substantial portion said reverse-propagating ASE through said second fiber Bragg grating.

2. The method of claim 1, wherein said first Bragg grating is written into said amplifier fiber.

3. The method of claim 1, wherein said second Bragg grating is written into said non-amplifying fiber.

4. The method of claim 1, wherein said first Bragg grating is written into a third length of optical fiber spliced to said amplifier fiber.

5. The method of claim 1, wherein said amplifier fiber has an optical gain for said amplified signal in said reverse direction therethrough that is less than about 80% percent of the gain on said forward pass therethrough.

6. The method of claim 1, wherein said ASE bandwidth is at least about ten times greater than the signal bandwidth.

7. The method of claim 6, wherein said first and second Bragg gratings are each highly reflective for the center wavelength of the signal, have a reflection bandwidth sufficiently wide that essentially all of said amplified signal is reflected therefrom back along said optical fiber and sufficiently narrow that said substantial portion of said ASE is transmitted through said Bragg grating.

8. The method of claim 7, wherein said reflection bandwidth of each of said first and second Bragg gratings is about 1 nanometer or less.

9. The method of claim 7, wherein said substantial portion of said ASE transmitted by each of said first and second Bragg gratings is at least about 85%.

10. The method of claim 1, further comprising the step of delivering said twice-reflected amplified optical signal to an optical amplifier for further amplification.

11. A method of amplifying an optical signal, the signal being delivered by either a laser or an optical amplifier, and the optical signal having a power, a center wavelength and a bandwidth, the method comprising the steps of:
providing a length of amplifier fiber;
propagating the optical signal along said amplifier fiber in a forward direction therein while coupling optical pump light into said optical fiber to energize said optical fiber and provide optical gain therein, thereby amplifying the optical signal and generating amplified spontaneous emission (ASE) propagating in forward and reverse directions along said amplifier fiber, said ASE having a bandwidth substantially greater than the bandwidth of the optical signal, and the power of the signal and characteristics of the fiber being such that said optical gain therein for said amplified signal is greater in said forward direction than in said reverse direction;
providing a first fiber Bragg grating, said first fiber Bragg grating being highly reflective for the center wavelength of the signal, having a reflection bandwidth sufficiently wide that essentially all of said amplified signal is reflected therefrom and sufficiently narrow that ASE outside said reflection bandwidth is transmitted therethrough;
following said forward direction propagation along said amplifier fiber, reflecting said amplified optical signal from a first fiber Bragg grating in a reverse direction along said amplifier fiber while transmitting a substantial portion of said forward-propagating ASE through said first fiber Bragg grating;
providing a length of a non-amplifying optical fiber;
propagating said reflected amplified signal and reverse-propagating ASE from said amplifying fiber along said non-amplifying fiber in a forward direction therealong;
providing a second fiber Bragg grating, said second fiber Bragg grating having reflection bandwidth and transmission characteristics similar to those of said first fiber Bragg grating; and
following said forward direction propagation along said non-amplifying fiber, reflecting said reflected amplified optical signal from said second fiber Bragg grating to provide a twice-reflected amplified optical signal propagating in a reverse direction along said non-amplifying fiber while transmitting a substantial portion said reverse-propagating ASE through said second fiber Bragg grating and wherein said reflection bandwidth of each of said first and second Bragg gratings is about 1 nanometer or less.

12. The method of claim 11, wherein said first and second Bragg gratings each transmit greater than about 85 percent of said ASE.

13. The method of claim 11, wherein said amplifier fiber is a single-mode fiber.

14. The method of claim 11, wherein said non-amplifying fiber has an undoped core.

15. The method of claim 14, wherein said fiber is a single-mode fiber.

16. The method of claim 11, wherein said first Bragg grating is written into said amplifier fiber.

17. The method of claim 11, wherein said second Bragg grating is written into said non-amplifying fiber.

18. A method of amplifying an optical signal, the signal being delivered by either a laser or an optical amplifier, and the optical signal having a power, a center wavelength and a bandwidth, the method comprising the steps of:
providing a length of amplifier fiber;
propagating the optical signal along said amplifier fiber in a forward direction therein while coupling optical pump light into said optical fiber to energize said optical fiber and provide optical gain, thereby amplifying the optical signal and generating amplified spontaneous emission (ASE) propagating in forward and reverse directions in said amplifier fiber, said ASE having a bandwidth substantially greater than the bandwidth of the optical signal;
following said forward direction propagation in said amplifier fiber, reflecting said amplified optical signal from a first fiber Bragg grating in a reverse direction in said amplifier fiber while transmitting a substantial portion of said forward-propagating ASE through said first fiber Bragg grating;
providing a length of a non-amplifying optical fiber;
propagating said reflected amplified signal and reverse-propagating ASE from said amplifying fiber along said non-amplifying fiber in a forward direction therein;
following said forward direction propagation in said non-amplifying fiber, reflecting said reflected amplified optical signal from a second fiber Bragg grating to provide a twice-reflected amplified optical signal propagating in a reverse direction in said non-amplifying fiber while transmitting a substantial portion said reverse-propagating ASE through said second fiber Bragg grating; and
delivering said twice-reflected amplified optical signal to an optical amplifier for further amplification.

19. The method of claim 18, wherein the signal power is such that said amplifier fiber has substantially greater optical gain for said amplified optical signal in said forward direction therethrough than in said reverse direction therethrough.

20. The method of claim 18, wherein said amplifier fiber has an optical gain for said amplified signal in said reverse direction therethrough that less than about 80% percent of the gain on said forward pass therethrough.

21. A method of amplifying an optical signal, the signal being delivered by either a laser or an optical amplifier, and the optical signal having a power, a center wavelength and a bandwidth, the method comprising the steps of:

provide a length of amplifier fiber;

propagating the optical signal along said amplifier fiber in a forward direction therein while coupling optical pump light into said optical fiber to energize said optical fiber and provide optical gain therein, thereby amplifying the optical signal and generating amplified spontaneous emission (ASE) propagating in forward and reverse directions along said amplifier fiber, said ASE having a bandwidth substantially greater than the bandwidth of the optical signal, and the power of the signal and characteristics of the fiber being such that said optical gain therein for said amplified signal is greater in said forward direction than in said reverse direction;

providing a first fiber Bragg grating, said first fiber Bragg grating being highly reflective for the center wavelength of the signal, having a reflection bandwidth sufficiently wide that essentially all of said amplified signal is reflected therefrom and sufficiently narrow that ASE outside said reflection bandwidth is transmitted therethrough;

following said forward direction propagation along said amplifier fiber, reflecting said amplified optical signal from a first fiber Bragg grating in a reverse direction along said amplifier fiber while transmitting a substantial portion of said forward-propagating ASE through said first fiber Bragg grating;

providing a length of a non-amplifying optical fiber;

propagating said reflected amplified signal and reverse-propagating ASE from said amplifying fiber along said non-amplifying fiber in a forward direction therealong;

providing a second fiber Bragg grating, said second fiber Bragg grating having reflection bandwidth and transmission characteristics similar to those of said first fiber Bragg grating; and following said forward direction propagation along said non-amplifying fiber, reflecting said reflected amplified optical signal from said second fiber Bragg grating to provide a twice-reflected amplified optical signal propagating in a reverse direction along said non-amplifying fiber while transmitting a substantial portion said reverse-propagating ASE through said second fiber Bragg grating and wherein said amplifier fiber is a single-mode fiber.

22. A method of amplifying an optical signal, the signal being delivered by either a laser or an optical amplifier, and the optical signal having a power, a center wavelength and a bandwidth, the method comprising the steps of:

providing a length of amplifier fiber;

propagating the optical signal along said amplifier fiber in a forward direction therein while coupling optical pump light into said optical fiber to energize said optical fiber and provide optical gain therein, thereby amplifying the optical signal and generating amplified spontaneous emission (ASE) propagating in forward and reverse directions along said amplifier fiber, said ASE having a bandwidth substantially greater than the bandwidth of the optical signal, and the power of the signal and characteristics of the fiber being such that said optical gain therein for said amplified signal is greater in said forward direction than in said reverse direction;

providing a first fiber Bragg grating, said first fiber Bragg grating being highly reflective for the center wavelength of the signal, having a reflection bandwidth sufficiently wide that essentially all of said amplified signal is reflected therefrom and sufficiently narrow that ASE outside said reflection bandwidth is transmitted therethrough;

following said forward direction propagation along said amplifier fiber, reflecting said amplified optical signal from a first fiber Bragg grating in a reverse direction along said amplifier fiber while transmitting a substantial portion of said forward-propagating ASE through said first fiber Bragg grating;

providing a length of a non-amplifying optical fiber;

propagating said reflected amplified signal and reverse-propagating ASE from said amplifying fiber along said non-amplifying fiber in a forward direction therealong;

providing a second fiber Bragg grating, said second fiber Bragg grating having reflection bandwidth and transmission characteristics similar to those of said first fiber Bragg grating; and following said forward direction propagation along said non-amplifying fiber, reflecting said reflected amplified optical signal from said second fiber Bragg grating to provide a twice-reflected amplified optical signal propagating in a reverse direction along said non-amplifying fiber while transmitting a substantial portion said reverse-propagating ASE through said second fiber Bragg grating wherein said non-amplifying fiber has an undoped core.

\* \* \* \* \*